May 4, 1948.　　　R. HEREFORD　　　2,440,746
VEHICLE BODY MOUNTING
Filed March 10, 1945　　　6 Sheets-Sheet 1
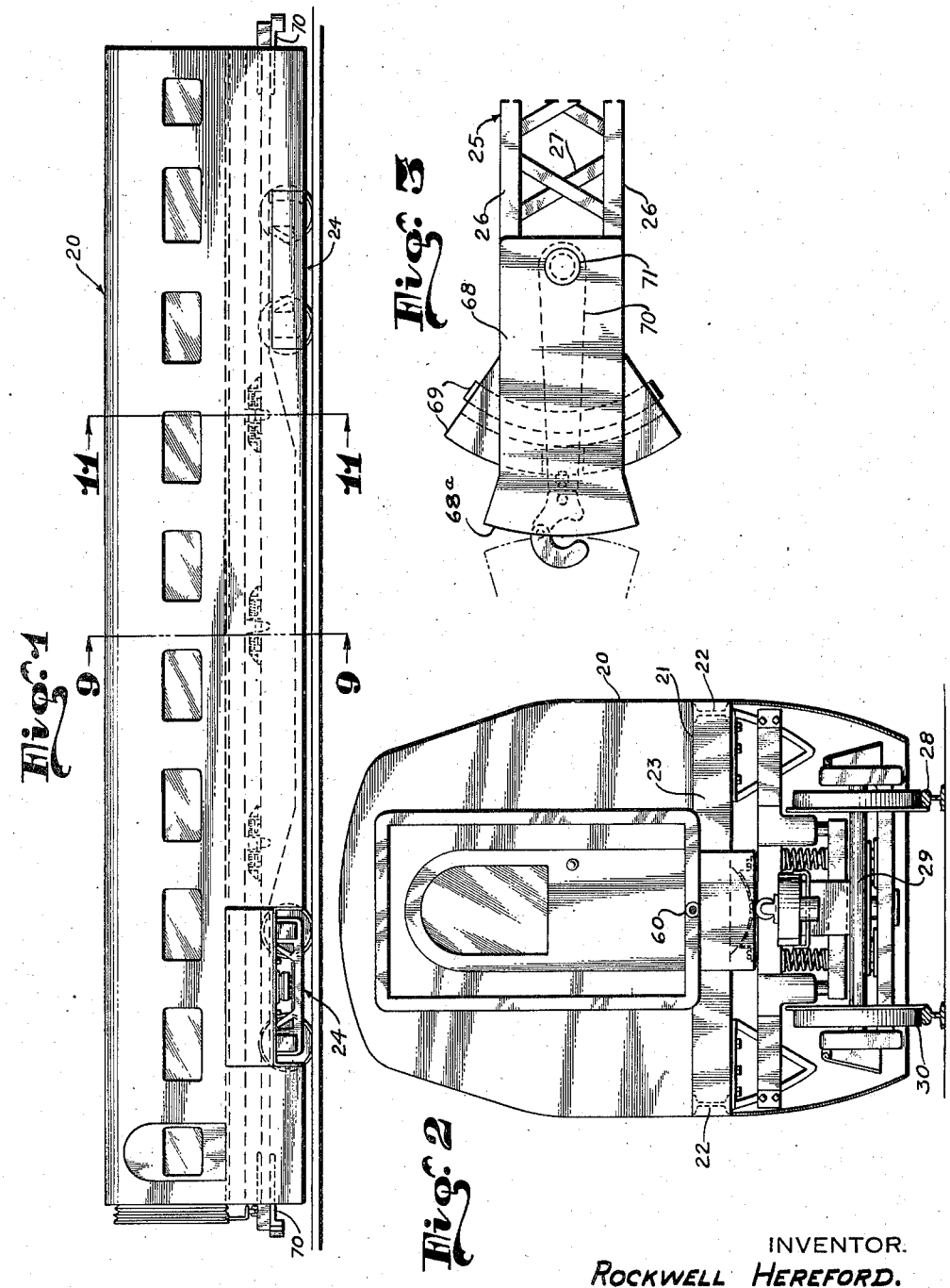
INVENTOR.
ROCKWELL HEREFORD.
BY
C. Lauren Maltby
ATTORNEY.

May 4, 1948.  R. HEREFORD  2,440,746
VEHICLE BODY MOUNTING
Filed March 10, 1945  6 Sheets-Sheet 2

INVENTOR.
ROCKWELL HEREFORD.
BY
ATTORNEY.

INVENTOR.
ROCKWELL HEREFORD.
BY C. Lauren Maltby
ATTORNEY.

May 4, 1948.  R. HEREFORD  2,440,746
VEHICLE BODY MOUNTING
Filed March 10, 1945  6 Sheets-Sheet 4
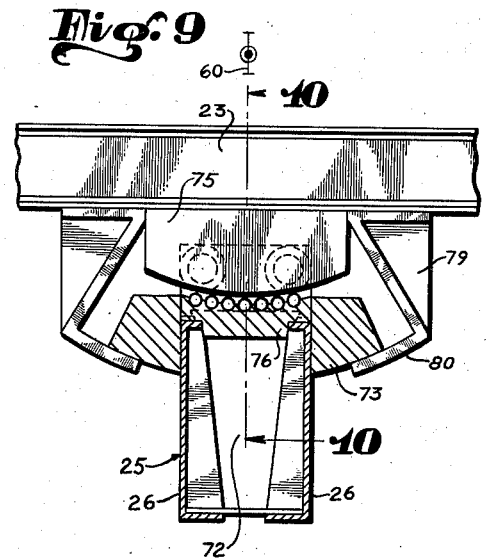
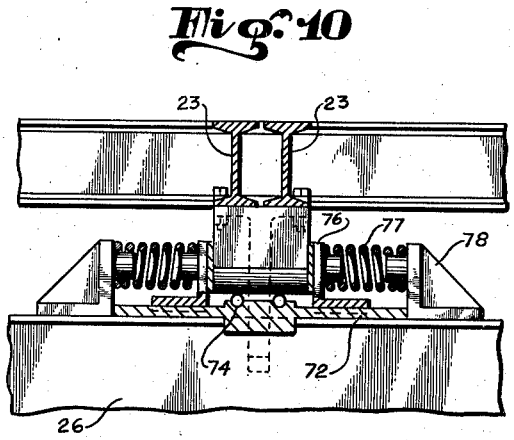
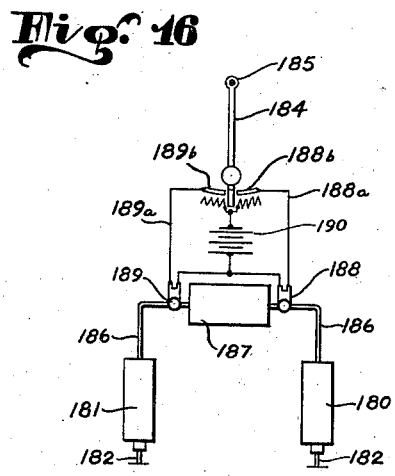
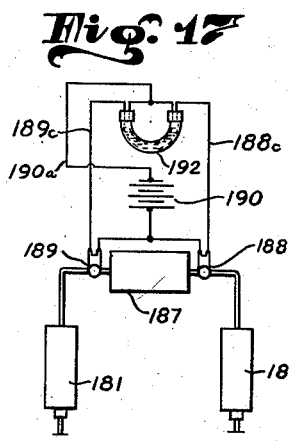
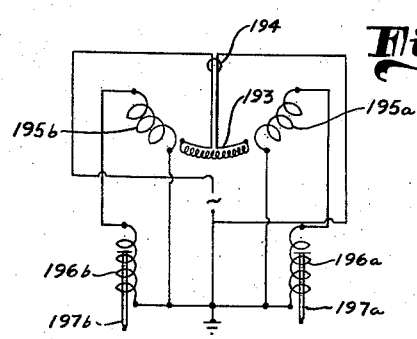
INVENTOR.
ROCKWELL HEREFORD.
BY
ATTORNEY.

May 4, 1948.   R. HEREFORD   2,440,746
VEHICLE BODY MOUNTING
Filed March 10, 1945   6 Sheets-Sheet 5

INVENTOR.
ROCKWELL HEREFORD.
BY
*C. Lauren Maltby*
ATTORNEY.

May 4, 1948.  R. HEREFORD  2,440,746
VEHICLE BODY MOUNTING
Filed March 10, 1945  6 Sheets-Sheet 6

INVENTOR.
ROCKWELL HEREFORD.
BY C. Lauren Maltby
ATTORNEY.

Patented May 4, 1948

2,440,746

UNITED STATES PATENT OFFICE 2,440,746

VEHICLE BODY MOUNTING

Rockwell Hereford, Pasadena, Calif.

Application March 10, 1945, Serial No. 582,074

13 Claims. (Cl. 105—453)

This invention relates to vehicles, and more especially to a vehicle body mounting or support, such as a railway car truck, and includes a novel truck construction.

An object of the invention is to provide novel improvements in the mounting of a vehicle body in a vehicle, which vehicle may be especially adapted for land, air or water.

Another object of the invention is to provide a vehicle body mounting on a portion of a vehicle related thereto so that the vehicle adjusts itself to the combination of gravitational pull, centrifugal force and to forces due to inertia against sidewise motion so that a "banking action" may be obtained, thereby reducing or eliminating unpleasant riding conditions.

Another object of the invention is to provide a novel design of vehicle body mounting for railway cars which overcomes limitations to track bed banking by providing a simple pendulum action to adjust the car correctly to the particular speed and curvature of the track, and to some side motion of the car truck regardless of super-elevation of one rail of the track.

A further object of the invention is to provide a vehicle body mounting for a vehicle, such as a railway car, in which floating spring action is provided without truck wobble at high speeds.

Another object is to provide a vehicle body mounting, which when applied to a vehicle, such as a railway car, provides for rotation of the car body in relation to the truck in a plane at right angles to the rails, which rotation is controlled or cushioned either by the effect of a simple pendulum principle or by separate spring action.

Another object of the invention is to provide a vehicle body mounting in which the body has a pendulum relation to the vehicle in a plane at right angles to the direction of travel, and in which the rotational movement may be actuated, controlled or cushioned by auxiliary power apparatus utilizing air, electric, hydraulic, mechanical or other means, including springs and snubbers.

An additional object is to provide a vehicle body mounting above a substructure, such as a railway truck so arranged as to obtain the effect, in at least one plane, of suspension of the body from a point above its center of gravity.

A further object is to provide a novel railway type vehicle wherein the draw bar pull or push is transmitted to the car body or trucks through springs or other cushioning means.

Another object of the invention is to provide a novel car and truck construction wherein all springing action is performed by separate springs, each positioned and designed for a specific load condition.

Another object of the invention is to provide a car construction having a substantially solid or rigid center sill mounted on the truck structure or body, but essentially independent thereof and resiliently associated therewith wherein all of the draft forces, either of push or pull character, are received and transmitted from car to car without being directly transmitted to each car body.

Other objects and advantages will become apparent from the more specific description of the invention illustrated on the accompanying drawings, which description and drawings are to be considered illustrative of a form which the invention may assume, but not limiting the invention to such particular form.

In the drawings:

Fig. 1 is a side view of a railway car incorporating an embodiment of my invention.

Fig. 2 is an end view of the same.

Fig. 3 is a fragmentary plan view showing the coupler mounting features.

Fig. 9 is a fragmentary sectional view taken along the line 9—9 of Fig. 1.

Fig. 10 is a sectional view taken along the line 10—10 of Fig. 9.

Fig. 16 is a diagrammatic view of an auxiliary actuation and control device.

Fig. 17 is a similar view of another form of the actuation and control device.

Fig. 18 is a similar view of a further modified form of the actuation and control device.

Figure 4:
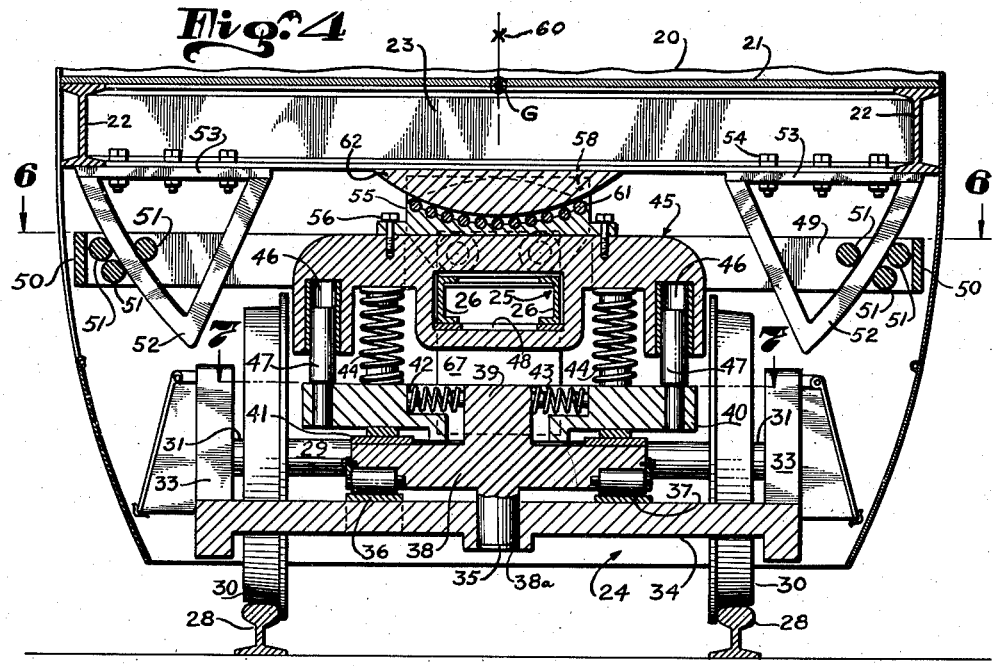
Fig. 4 is a transverse view in section showing my invention applied to the car body and truck.
Figure 5:
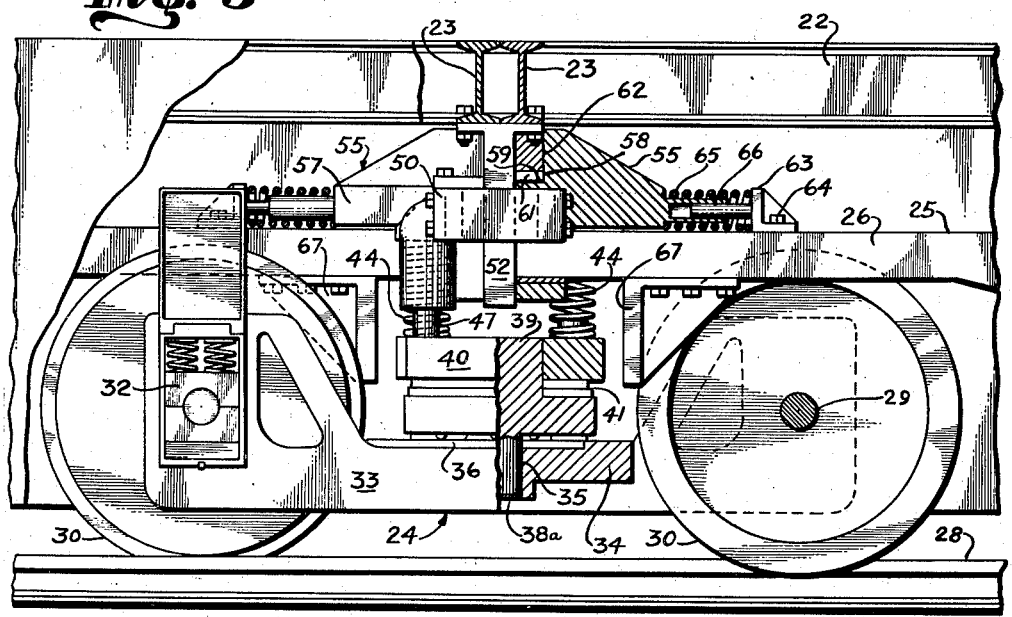
Fig. 5 is a side view, partly in section, of the same.

Referring more particularly to the drawings, I show a vehicle 20 which by way of illustration of my invention is a railway car having the usual frame structure including a floor 21 supported on a plurality of longitudinally extending structural members such as I-beams 22, and a plurality of transverse I-beams 23. The car body 20 is supported on a pair of trucks 24 and may be partially supported on a center sill 25, as will be more fully disclosed hereinafter. Center sill 25 extends substantially the length of the car body and may comprise a single I-beam member, however in the form illustrated, consists of a pair of spaced channel members 26 fabricated as a unit with a plurality of diagonal braces 27.

I show rails 28 on which the car may be operated, the truck having a pair of wheel axles 29 and wheels 30, the axles having bearing portions 31 engaging journal bearings 32 to which a pair of side frames 33 are suitably secured through the conventional springs if desired.

A load supporting bearing plate member 34 extends between side frames 33 and may be formed integrally therewith, and plate 34 is provided with a central pivot bore 35 and carries a pair of arcuately shaped bearing plate members 36 which may be suitably secured thereto as by welding or otherwise. Plate members 36 each support a plurality of rollers 37 which are arcuately disposed at the under side of a load supporting member 38 which has a downwardly extending pivot portion 38a having a bearing connection in pivot bore 35 of plate 34. Member 38 has an upwardly extending rectangular shaped block portion 39 and supports a plate member 40 through the medium of a plurality of bearing plate members 41, member 40 having a rectangular opening or aperture 42 to receive block portion 39 of member 38, a plurality of springs 43 being positioned in aperture 42 between block portion 39 and the ends of aperture 42. By this construction it will be apparent that member 38 and plate 40 are adapted for relative movement laterally but not rotationally such that sharp sidewise movements or vibrations of the wheels 30 will not be transmitted to the plate 40 except through the springs 43, which will absorb such shocks.

Plate 40 supports a plurality of springs 44 which in turn support a transverse guide frame 45 which is provided with a plurality of downwardly presented guide recesses 46 in which a plurality of stud members 47 extend, the stud members being suitably secured to and extend vertically from plate 40. Recesses 46 and the studs 47 may be of circular section and the recesses may be provided with lining material to provide bearing contact with the studs in such manner that lateral movement between plate 40 and frame 45 is substantially prevented. Recesses 46 and stud members 47 may, however, be formed with a rectangular cross section by which longitudinal movement between these parts may occur should the draw bar receive excessive shocks which would tend to shear stud members 47.

Figure 6:
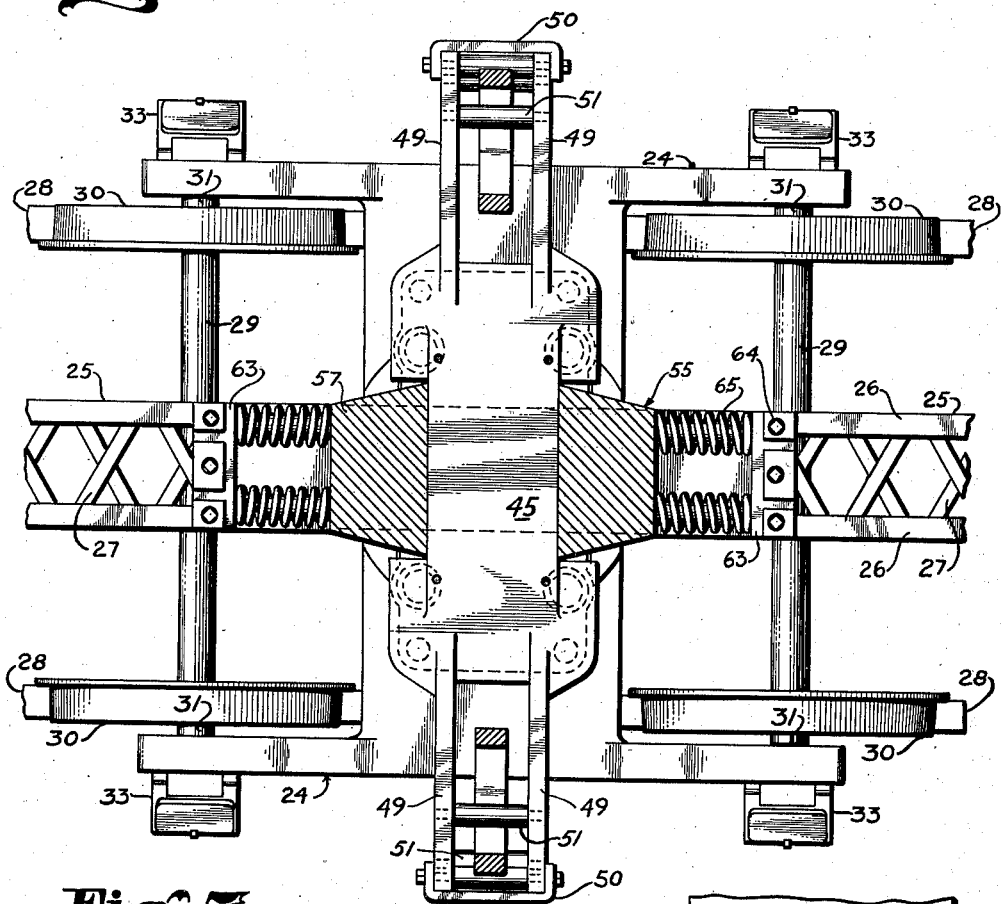
Fig. 6 is a plan section of the same, the section taken along the line 6—6 of Fig. 4.
Figure 7:
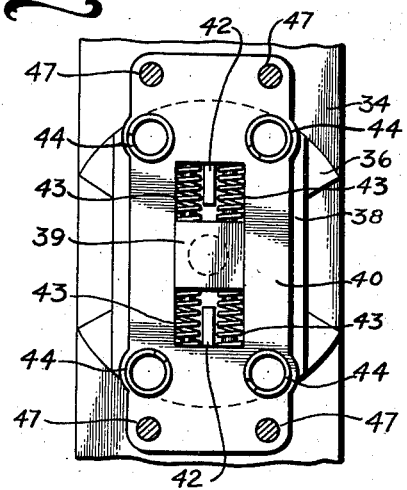
Fig. 7 is a sectional view taken along the line 7—7 of Fig. 4.
Figure 8:
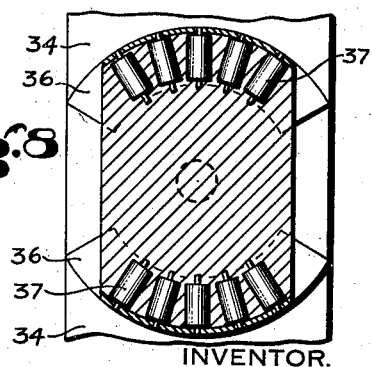
Fig. 8 is a fragmentary plan view showing roller features also seen in Figs. 4 and 5.

Frame 45 is provided with a longitudinal opening 48 and further provided with pairs of side extension members 49, the ends of which are secured together as by braces 50, and a plurality of rollers 51 are secured between pairs of side members 49 adjacent braces 50 as shown in Figs. 4 and 6. Rollers 51 are spaced as shown and provide guides for arcuate portions 52 of a pair of guide frames 53 suitably secured to the car body floor structural members 22 or 23. Center sill 25 extends through opening 48 being slidable therein, and the load thereof is carried by guide frame 45.

A bearing block 55 is mounted on frame 45 and secured thereto as by bolts 56, and has longitudinally extending portions 57 which rest on center sill 25, however having sliding engagement therewith. Block 55 has a recess in the lower portion thereof in which is positioned the upper central portion of frame 45.

Bearing block 55 has a bearing recess 58 provided with an arcuate bearing surface 59 at the base of the recess, the arc center of surface 59 being along an axis 60 extending longitudinally of the car, which axis is the center of rotation of car body 20. A plurality of bearing rollers 61 are suitably positioned in or on surface 59 and provide rotational support for a load bearing member 62 which is suitably secured to transverse floor beam members 23. Member 62 has side wall portions positioned adjacent the side walls of recess 58 and an arcuate lower bearing surface which rides on rollers 61. A pair of thrust plate blocks 63 are secured as by bolts 64 on center sill 25, and a plurality of springs 65 are positioned between blocks 63 and bearing block 55, suitable spring retaining elements 66 being secured to blocks 55 and 63. A pair of stop flanges 67 are secured and extend downwardly from center sill 25 and are adapted to engage plate 40 in the event of excessive draw bar impact which would otherwise tend to shear stud members 47.

In Fig. 3 I show the end portion of sill 25 which comprises a structure 68 integrally or rigidly secured thereto and providing a pair of arcuately shaped guide bearing plate members 69 for a coupler structure 70 which is pivoted at 71 to structure 68. Structure 68 is shown as having arcuate end portions 68a which serves to receive draw bar end thrust from the adjacent car, which end thrust may include crash forces to be transmitted through the center sill.

The operation of the invention as thus far described should be obvious. The car body 20 is supported on, and the load thereof transmitted through bearing member 62, rollers 61, bearing block 55 to guide frame 45. The load is transmitted thence through springs 44, plate 40, bearing plate members 41, load supporting member 38, rollers 37 and bearing plate members 36 to bearing plate member 34 which is a part of the structure of side frames 33. The car body 20 is free to rotate about center of rotation 60 on rollers 61, the rotation being guided and limited by guide frames 53 and the arcuate members 52 thereof in cooperation with rollers 51.

Vertical springing action of the car body is provided by springs 44, guide frame 45 being restricted against lateral movement by recesses 46 and studs 47. Lateral vibration or whipping of the wheels 30 is absorbed and prevented from being transmitted to the car body by the springing action provided by springs 43 where such vibration or whipping action transmitted from the wheels through bearing plate 34 and load supporting member 38 is absorbed. Rotation of the truck structure including the wheels and bearing plate 34 is provided by pivot portion 38a of member 38 and rollers 37 riding on roller bearing plate members 36. It will thus be clearly seen that vertical and lateral vibration or movement between the car body and the wheel structure including member 38 is absorbed separately by springs 43 and 44, and each set of springs may be designed especially for the particular character of the vibration it is required to absorb.

It will further be observed that the draw bar pull or push is transmitted from center sill 25 through thrust plate blocks 63, springs 65 and bearing block 55 to load bearing member 62 secured to the car frame structure, and therefore unusual or severe draw bar impact shocks or forces will be absorbed as far as possible through springs 65, and will be usually reduced in the effect thereof on the occupants or other load carried by the car body 20. This draw bar force is also transmitted to frame 45 and through studs 47, plate 40 and member 38 to plate 34 and the wheels. In the event of excessive draw bar shock, which would compress springs 65 to their limit, stop flanges 67 will engage plate 40 and prevent shearing or other damage to studs 47 which might otherwise be too weak to transmit such shocks received through plate 45 and bearing block 55.

It will be assumed that the center of gravity G is below the center of rotation 60 and the car body is therefore similar to a pendulum pivoted at 60 and free to rotate around a longitudinal axis defined by projection of point 60 as an axis line.

The momentum of the car body 20, when operated at appreciable speed, will cause pendulum action of the car body when rounding a curve causing the center of gravity G to be moved to one side or the other from the vertical, resulting in a pivoting of the car body about the center of rotation 60 which is the center of curvature of bearing surface 59, which pivoting movement adjusts the angle of inclination to the speed of the car and the curvature of the track, and upon a straightening of the travel of the vehicle on the track or a decrease in the speed, the resultant of the gravitational and centrifugal forces applied to the center of gravity G will restore the car body to upright position or to a position in which the resultant of these forces is perpendicular to the floor of the car. This angular movement about the center of rotation 60 may be snubbed or opposed by suitably disposed springs (not shown) applied between floor beams 22 or 23 or other car body location and extension members 49.

In Figs. 9 to 12 I show structures providing auxiliary support for the car body on the center sill. In these figures the center sill is shown as having additional vertical height than is shown in Figs. 1 to 6. I show a bearing plate member 72 extending along and suitably secured on the upper portion of sill members 26 and having laterally extending guide bearing portions 73 which have an arcuate lower bearing surface. A plurality of bearings 74, such as ball bearings, are suitably retained in the upper face of bearing member 72 which is arcuately formed about the center of rotation 60. A bearing block 75 is supported on bearings 74 and has a similarly centered lower bearing face and is suitably secured to transverse beam members 23 of the car body 20. I provide a pair of angle members 76 slidably supported on, and suitably keyed to, bearing plate member 72, and a pair of springs 77 are positioned between each angle member 76 and a buffer angle member 78 secured to and supported on sill members 26. A pair of bracket members 79 are suitably secured to beam members 23 and are provided with inwardly directed guide bearing shoes 80 which engage the lower bearing surface of bearing portion 73 of bearing plate member 72.

By this structure it will be apparent that rotation of the car body is provided on bearings 74 and that draw bar impact is transmitted through angles 78, spring 77 and angles 76 to bearing block 75 which is secured to the car frame, and such impact is thus absorbed by springs 77. It will further be clear that bearing plate member 72 including the guide bearing portions 73, together with brackets 79 and shoes 80, will serve to limit any tendency of the car body to move upwardly with respect to sill 25. The structure shown in Figs. 9 and 10 is seen to be positioned at the center of the car while the structure shown in Figs. 11 and 12, which is adapted for support only without the use of brackets 79, is positioned between the center of the car and the trucks. By this structure the center sill may be considered a part of car body 20 for purposes of contributing strength and rigidity to the car body and thereby reducing the necessary weight of the car body. The center sill and bracket members 79, while limiting any tendency of the car body to vibrate vertically at the center, also serve to limit longitudinal flexure and torsional as well as some lateral strains on the car body.

Figure 13:
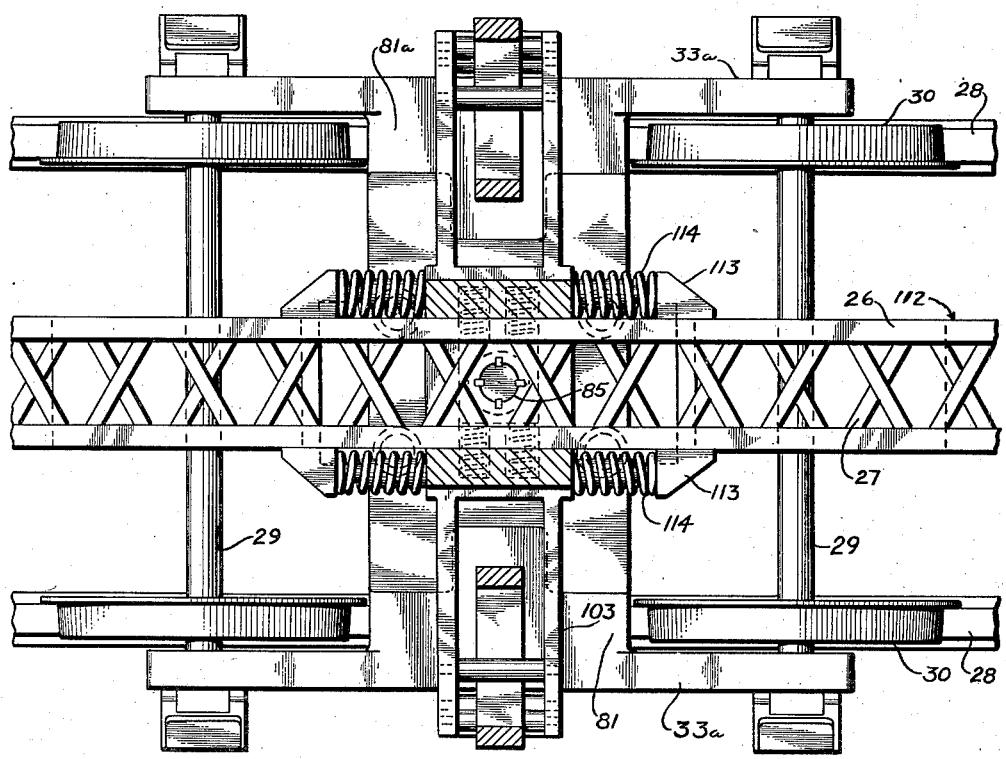
Fig. 13 is a plan view of a modified form of truck.
Figure 11:
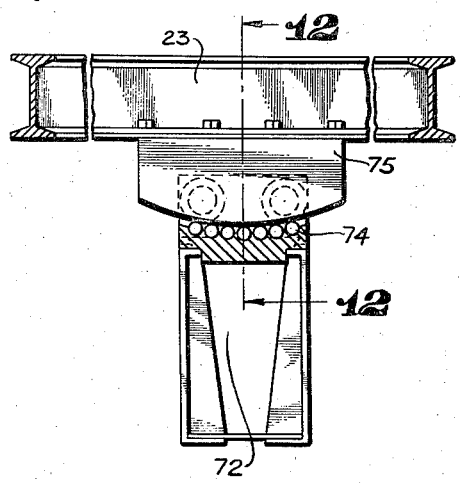
Fig. 11 is a fragmentary sectional view taken along the line 11—11 of Fig. 1.
Figure 12:
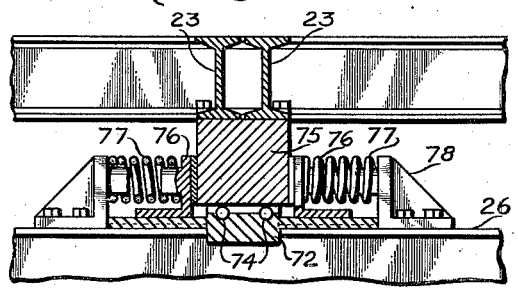
Fig. 12 is a sectional view taken along the line 12—12 of Fig. 11.
Figure 14:
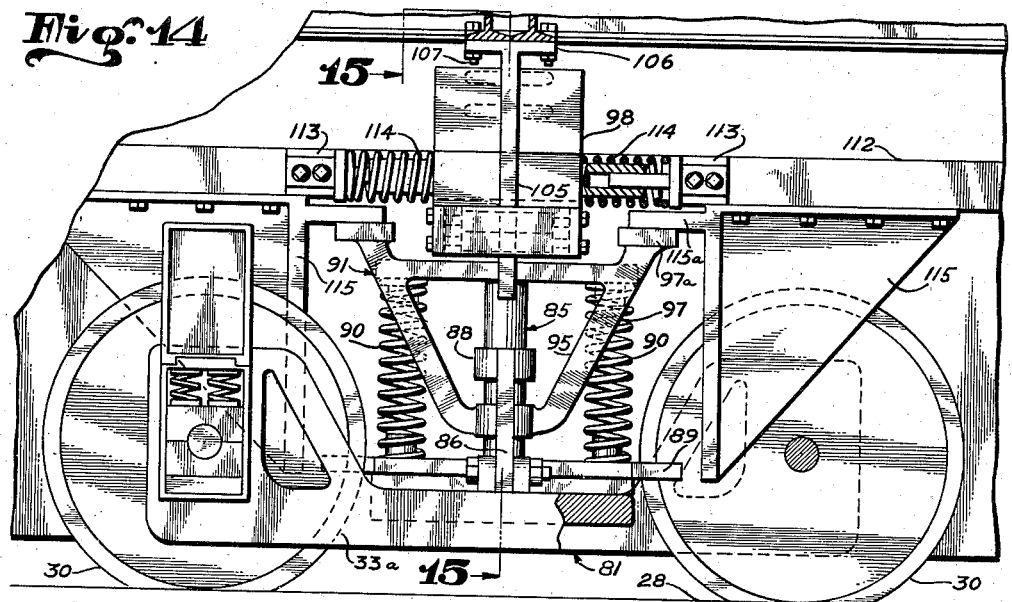
Fig. 14 is a side view of the truck of Fig. 13.
Figure 15:
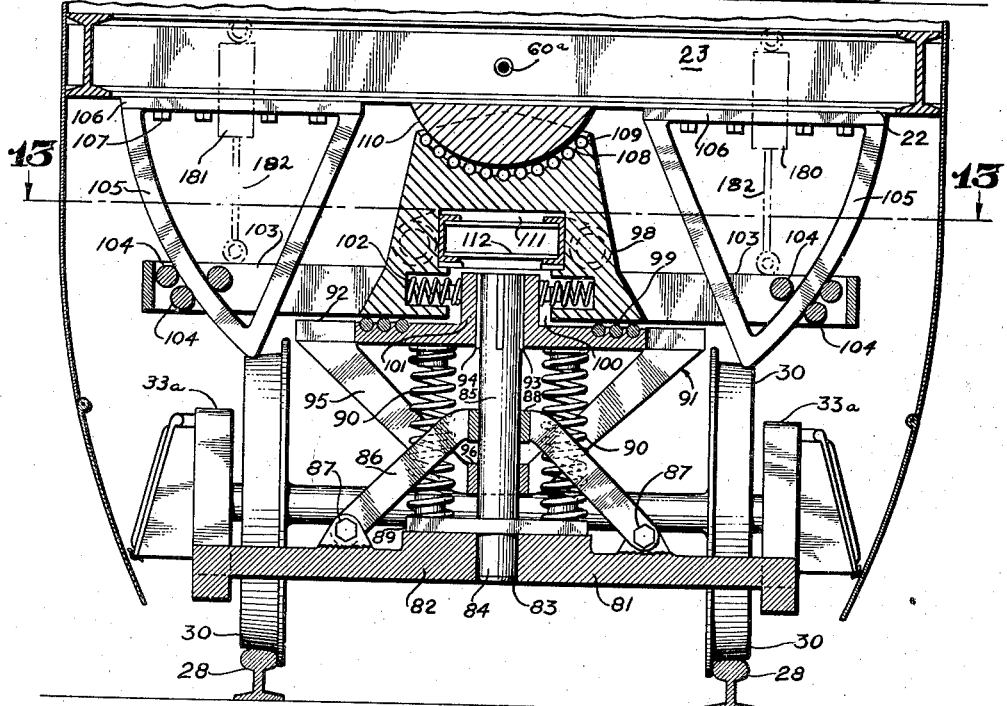
Fig. 15 is a transverse sectional view of the same taken along the line 15—15 of Fig. 14.

In Figs. 13 to 15 I show a modified form of truck structure. In these figures the car body, wheels, axles and journal structures are substantially similar to those shown in Figs. 1 to 6. The modified features include side frame members 33a between which extends a transverse bearing plate member or portion 81 which has a central thrust bearing portion 82 and a pivot bore 83 in which is rotatably positioned the end portion 84 of a pivot member 85.

I show frame members 86 which extend angularly from bearing plate 81 and secured thereto by bolts 87 to provide an additional bearing 88 for pivot 85. Pivot 85 has a thrust plate bearing portion 89 which rests on bearing portion 82. A plurality of springs 90 are mounted on bearing plate 89 and support an intermediate frame structure 91.

Frame structure 91 has a horizontal plate portion 92 resting on the upper ends of springs 90 and formed with a pivot bore 93 having splined engagement 94 with pivot 85 permitting vertical but non-rotative movement therewith. Plate 92 has a plurality of bracket portions 95 extending downwardly and inwardly and providing a slide bearing 96 on pivot 85. Plate 92 also has brace portions 97 extending downwardly to bearing 96 at right angles to brackets 95 and an upwardly extending brace portion 97a. A transverse guide and load supporting plate member 98 is carried on plate 92 on suitable rollers 99. Plate member 98 has a rectangular slot 100 through which extends a boss portion 101 of plate 92. Springs 102 are positioned in slot 100 on both sides of boss 101 and engage the extreme recessed ends of the slot.

Plate member 98 has spaced end portions 103 providing mounting means for bearings, such as a plurality of rollers 104, which rollers provide guide means for and engage guide members 105 of guide frames 106 suitably secured to floor beams 22 or 23 as by bolts 107. Member 98 is seen as extending upwardly and having an arcuate bearing recess 108 which may be provided with bearing rollers 109 for a load supporting bearing block 110 secured to beam members 23, the center of rotation of the car body and bearing block 110 being along a longitudinal axis indicated 60a.

Member 98 has a longitudinal opening 111 through which extends the center sill 112 which is supported by member 98 and is slidable within the slot or opening 111 thereof. A plurality of suitably designed buffer blocks 113 are secured to side portions of center sill 112, and a plurality of springs 114 are positioned between blocks 113 and member 98. A pair of buffer angle members 115 are secured to and below center sill 112 and adapted to engage plate 89 in the event of draw bar impact which will move angles 115 the intervening distance therebetween. Members 115 each have a flanged portion 115a extending toward the truck structure adapted to engage adjacent brace portion 97a in the event of track irregularities or other forces which would tend to rotate the truck structure about a horizontal axis transverse to the longitudinal axis of the car.

The operation of the structure, as shown in Figs. 13 to 15, is substantially similar to that of Figs. 1 to 6 as will be apparent. Vertical springing of the load is carried by springs 90 and lateral vibration or whipping of the wheel structure is absorbed by springs 102 between boss 101 and plate member 98. Draw bar impact is transmitted from center sill 112 to the car body and truck through springs 114 and the vertically extending portion of member 98. No springing is provided between member 98 and bearing block 110 since draw bar impact will be transmitted from center sill 112 through buffer structures located between the trucks, as shown and described in connection with Figs. 9 to 12.

In Figs. 16, 17 and 18 are disclosed diagrammatically three forms of actuation and control devices, in connection with Fig. 15. In Fig. 16 I show a pair of reciprocating motors 180 and 181, such as hydraulic cylinders, suitably secured to a floor I-beam such as beam 23, each cylinder having a fluid operated piston and a piston rod 182 secured to a convenient point on extension members 103. Motors 180 and 181 may be actuated alternately from a pendulum 184 mounted on a pivot 185 at any suitable place in the car, and adapted for swinging movement in a plane transverse to the length of the car. Motors 180 and 181 are provided with conduits 186 connected to a suitable source of fluid or hydraulic pressure 187 through control valves 188 and 189.

A battery 190 supplies power for actuating valves 188 and 189 through circuit wires which include wires 188a and 189a connected to switch contacts 188b and 189b, which contacts are adapted to be closed as the pendulum 184 swings either to the right or left of the vertical. Thus, upon the car moving in a direction looking into the plane of the figures of the drawing and rounding a curve, say to the left, the pendulum will swing to the right, causing a closing of contacts 188b and operating control valve 188 and actuating motor 180, which will tilt the car body 20 in a counter-clockwise direction until the pendulum has returned to the mid position, in which position it will be parallel to the resultant of the gravitational and centrifugal forces and perpendicular to the car floor. The operation of motor 181 to provide a return movement, either partially or full amount, of the car body, will follow in an obvious manner.

In Fig. 17 I show a modified form of body tilting actuator and control means. In this figure, motors 180 and 181 are provided as before and similarly controlled, with the exception of control wires 188c and 189c which are shown connected into the end portions of an arcuately shaped mercury tube 192. The battery 190 has a common terminal 190a in each end of the tube 192. Tube 192 is mounted in a car in a manner similar to pendulum 184, and upon being subjected to a laterally directed centrifugal force, the mercury in the tube will flow to an end of the tube, thereby closing the contacts through wires 188c or 189c, actuating control valve 188 or 189 thus operating motor 180 or 181 in the same manner as in Fig. 16.

In Fig. 18 I show a further modified form of body tilting actuator and control means. In this figure, I show a pendulum 193 pivoted at 194 and comprising an induction coil connected to an alternating current power source as shown. The circuit includes coils 195a and 195b connected respectively to solenoids 196a and 196b having plunger rods 197a and 197b secured between the car body and truck frame. Current from coil 193 induces an actuating current for the solenoids when the pendulum swings into coupling relation to coils 195a or 195b.

The above described body tilting actuator and control means are to be considered typical examples of a few of a larger group of remote control and actuating means for tilting or balancing the car body in its rotational movement about the longitudinal center of rotation, and other modified forms of actuator and control means may be employed if desired. Such other forms might incorporate electronic tube and photo cell devices, also electrical condensers, resistors and other means of amplifying small amounts of energy or movements into the larger amounts necessary for effecting the car body rotational movements or dampening the same if of vibratory nature.

It is to be understood that the terms "draw bar pull," "force," "propelling force," "draft," and the like are used in a general sense and should be considered as applicable to forces of either push or pull type, and that such forces may be transmitted either from the center sill to the car body and truck structures or may be transmitted in a reverse direction by the energy of motion of the vehicle from the car body and/or the truck structure to the center sill such as may occur when a train of a number of cars is decelerating by braking action or upon the occurrence of a crash.

Having thus described my invention, what I claim and desire to secure by Letters Patent is:

1. In a vehicle having a body and a sub-structure rotationally supporting the body about a longitudinal axis of the vehicle, substantially rigid means extending substantially the length of the vehicle and mounted on the sub-structure to receive and transmit a propelling force to the body and sub-structure, said means adapted to transmit a portion of the weight load of said body to said sub-structure.

2. In a vehicle having a body and a sub-structure rotationally supporting the body about a longitudinal axis of the vehicle, substantially rigid means extending substantially the length of the vehicle and mounted on the sub-structure to receive and transmit a propelling force to the body and sub-structure, said means having rotative engagement with said body and adapted to transmit a portion of the weight load of said body to said sub-structure.

3. In a traction type vehicle, in combination, a body, a truck structure supporting the body and having a wheel frame pivotable about a vertical axis, said body being mounted on said truck structure for rotation about a longitudinal axis of the vehicle and being gravitationally balanced on said structure, and substantially rigid draft means for said vehicle extending the length thereof slidably mounted on and resiliently engaging said truck structure.

4. In a traction type vehicle, in combination, a body, a truck structure supporting the body and having a wheel frame pivotable about a vertical axis, said body being mounted on said truck structure for rotation about a longitudinal axis of the vehicle and being gravitationally balanced on said structure, and substantially rigid draft means for said vehicle extending the length thereof slidably mounted on and resiliently engaging said truck structure independently of said wheel frame.

5. In a traction type vehicle, in combination, a body, a pair of truck structures supporting the body and each having a wheel frame pivotable about a vertical axis, said body being mounted on said truck structures for rotation about a longitudinal axis of the vehicle and being gravitationally balanced on said structures and substantially rigid draft means for said vehicle extending the length thereof slidably mounted on and resiliently engaging said truck structures.

6. In a vehicle, in combination, a body, a pair of truck structures supporting the body and each having a wheel frame pivotable about a vertical axis, said body being mounted on said truck structures for rotation about a longitudinal axis of the vehicle and being gravitationally balanced on said structures, and draft means for said vehicle slidably mounted on and resiliently engaging said truck structures, said body having rotational engagement with and being partially supported on said draft means.

7. In a vehicle in combination, a body, a pair of truck structures supporting the body and each having a wheel frame pivotable about a vertical axis, said body being mounted on said truck structures for rotation about a longitudinal axis of the vehicle and being gravitationally balanced on said structures and draft means for said vehicle slidably mounted on and resiliently engaging said truck structures, said body having rotational engagement with and being partially supported on said draft means, said draft means extending substantially the length of the vehicle and adapted to provide strength and rigidity to the car body.

8. In a vehicle, in combination, a body, a truck structure supporting the body and having a wheel frame pivotable about a vertical axis, said body being mounted on said truck structure for rotation about a longitudinal axis of the vehicle, means for effecting rotation of said body in response to centrifugal force to maintain said body so that the resultant of gravitational and centrifugal forces is perpendicular to the floor of said body, and draft means for said vehicle slidably mounted on and resiliently engaging said truck structure independently of said wheel frame, said first means including motor means connected to said body and structure and inertia controlled means for actuating said motor means.

9. In a traction type vehicle, in combination, a body, a truck structure supporting the body and having a wheel frame pivotable about a vertical axis, said body being mounted on said truck structure for rotation about a longitudinal axis of the vehicle, means for effecting rotation of said body in response to centrifugal force to maintain said body so that the resultant of gravitational and centrifugal forces is perpendicular to the floor of said body, and draft means for said vehicle slidably mounted on and resiliently engaging said truck structure independently of said wheel frame, said first means including a plurality of laterally spaced motor means connected to said body and structure and inertia controlled means for actuating said motor means.

10. A truck as described for a vehicle having a body, comprising a wheel frame including a bearing member, a load supporting member mounted on said bearing member for rotation about a vertical axis, a plate member mounted on said load supporting member for lateral movement thereon spring means between said supporting and plate members, and a guide frame resiliently supported on said plate member and adapted to support said vehicle body for rotation about a longitudinal axis of said body, said spring means being actuatable horizontally and laterally for absorbing and cushioning horizontal and lateral forces.

11. A truck as described for a vehicle having a body, comprising a wheel frame including a bearing member, a load supporting member mounted on said bearing member for rotation about a vertical axis, a plate member mounted on said load supporting member for lateral movement thereon spring means between said supporting and plate members, and a guide frame resiliently supported on said plate member and adapted to support said vehicle body for rotation about a longitudinal axis of said body, said plate member and said guide frame having interconnected means to prevent lateral movement therebetween.

12. A truck as described for a vehicle having a body, comprising a wheel frame including a bearing member, a load supporting member mounted on said bearing member for rotation about a vertical axis, a plate member mounted on said load supporting member for lateral movement thereon, and a guide frame resiliently supported on said plate member and adapted to support said vehicle body for rotation about a longitudinal axis of said body, said plate member and said guide frame having interconnected means to permit vertical movement and prevent lateral movement therebetween.

13. A truck as described for a vehicle having a body, comprising a wheel frame including a bearing member, a load supporting member mounted on said bearing member for rotation about a vertical axis, a plate member mounted on said load supporting member for lateral movement thereon, and a guide frame resiliently supported on said plate member and adapted to support said vehicle body for rotation about a longitudinal axis of said body, said plate member and said guide frame having interconnected means to permit vertical movement and prevent lateral movement therebetween, said means including a plurality of stud members and stud member recesses.

ROCKWELL HEREFORD.

REFERENCES CITED

The following references are of record in the file of this patent:

UNITED STATES PATENTS

| Number | Name | Date |
|---|---|---|
| 1,116,103 | Nichols | Nov. 3, 1914 |
| 1,152,863 | Thomson | Sept. 7, 1915 |
| 1,256,940 | Smith | Feb. 19, 1918 |
| 1,262,108 | Silver | Apr. 9, 1918 |
| 1,489,688 | Astrom | Apr. 8, 1924 |
| 1,732,675 | Duryea | Oct. 22, 1929 |
| 2,088,487 | Schoepf et al. | July 27, 1937 |
| 2,174,324 | Janeway | Sept. 26, 1939 |
| 2,198,668 | Janeway | Apr. 30, 1940 |
| 2,208,650 | Van der Sluyz | July 23, 1940 |